(12) United States Patent
Jung et al.

(10) Patent No.: US 12,716,979 B2
(45) Date of Patent: Aug. 25, 2026

(54) ANGULAR POSITION MEASUREMENT SYSTEM UTILIZING RADIO FREQUENCY SIGNAL

(71) Applicant: OWLYNK CO., LTD., Suwon-si (KR)

(72) Inventors: Seok Yoon Jung, Seoul (KR); Shin Hwan Hwang, Yongin-si (KR); Chul Hwan Yoon, Suwon-si (KR)

(73) Assignee: OWLYNK CO., LTD., Suwon-si (KR)

( * ) Notice: Subject to any disclaimer, the term of this patent is extended or adjusted under 35 U.S.C. 154(b) by 202 days.

(21) Appl. No.: 18/798,882

(22) Filed: Aug. 9, 2024

(65) Prior Publication Data

US 2025/0052849 A1 Feb. 13, 2025

(30) Foreign Application Priority Data

Aug. 10, 2023 (KR) ........................ 10-2023-0104593

(51) Int. Cl.
*G01S 3/14* (2006.01)

(52) U.S. Cl.
CPC ...................................... *G01S 3/14* (2013.01)

(58) Field of Classification Search
CPC ..... G01S 3/14; G01S 3/48; G01S 5/02; G01S 5/021; G01S 5/0221; H04L 27/206; H04L 27/22
See application file for complete search history.

(56) References Cited

U.S. PATENT DOCUMENTS 5,724,047 A * 3/1998 Lioio ........................ G01S 3/50 342/417
7,308,034 B2 12/2007 Jeon et al.
8,179,816 B1 * 5/2012 Vaidyanathan ........... G01S 5/14 370/252
9,350,587 B1 * 5/2016 Fang .................. H04L 27/2685
9,814,051 B1 11/2017 Shpak
11,765,678 B2 * 9/2023 Shpak .................. G01S 5/0215 455/456.1
2001/0020917 A1 * 9/2001 Hamada ............... H04B 7/0617 342/442
2009/0243932 A1 * 10/2009 Moshfeghi ............ G01C 21/20 342/378
2016/0242135 A1 * 8/2016 McLaughlin ...... H04B 1/71637

FOREIGN PATENT DOCUMENTS

KR 10-2004-0050814 A 6/2004
KR 10-2019-0065307 A 6/2019
KR 10-2562690 B1 8/2023

OTHER PUBLICATIONS

Korean Office Action mailed on Apr. 16, 2025 from the Korean Patent Office for Application No. 10-2023-0104593.

* cited by examiner

*Primary Examiner* — Peter M Bythrow

(57) ABSTRACT

Disclosed herein is to an angle-of-departure measurement technology that receives radio frequency signals transmitted from transmitting antennas and measures angular positions from the transmitting antennas with respect to the receiving antenna. A wireless receiver includes an IQ demodulator configured to perform IQ demodulation on signals received from the receiving antenna, a phase sample value can be calculated from a phase value of a ratio of I and Q signals, and a phase difference value between the plurality of transmitting antennas and the receiving antenna can be estimated from a phase sample value. An angular position of the wireless receiver can be calculated from the estimated phase difference value.

18 Claims, 6 Drawing Sheets

(1)
11-1
11-8
$a_A$ [m]
$T_A$ [sec]
Θ [rad]
S(t)
31
13
$f_c$ [HZ]
130
131
Lo
I(t)
Q(t)
40
CALCULATION UNIT 40
CALCULATION UNIT
31
IQ DEMODULATOR
130
SAMPLER
150
$T_S$
RECEIVING SIGNAL PHASE CALCULATOR
300
FREQUENCY ERROR CALCULATOR
400
SINGLE CHANNEL PHASE GRADIENT CALCULATOR
410
BUFFER
430
AVERAGE GRADIENT CALCULATOR
450
FREQUENCY ERROR REMOVER
500
BUFFER
510
ERROR SUBTRACTOR
530
PHASE DIFFERENCE ESTIMATOR
700
ANGULAR POSITION CALCULATOR
900

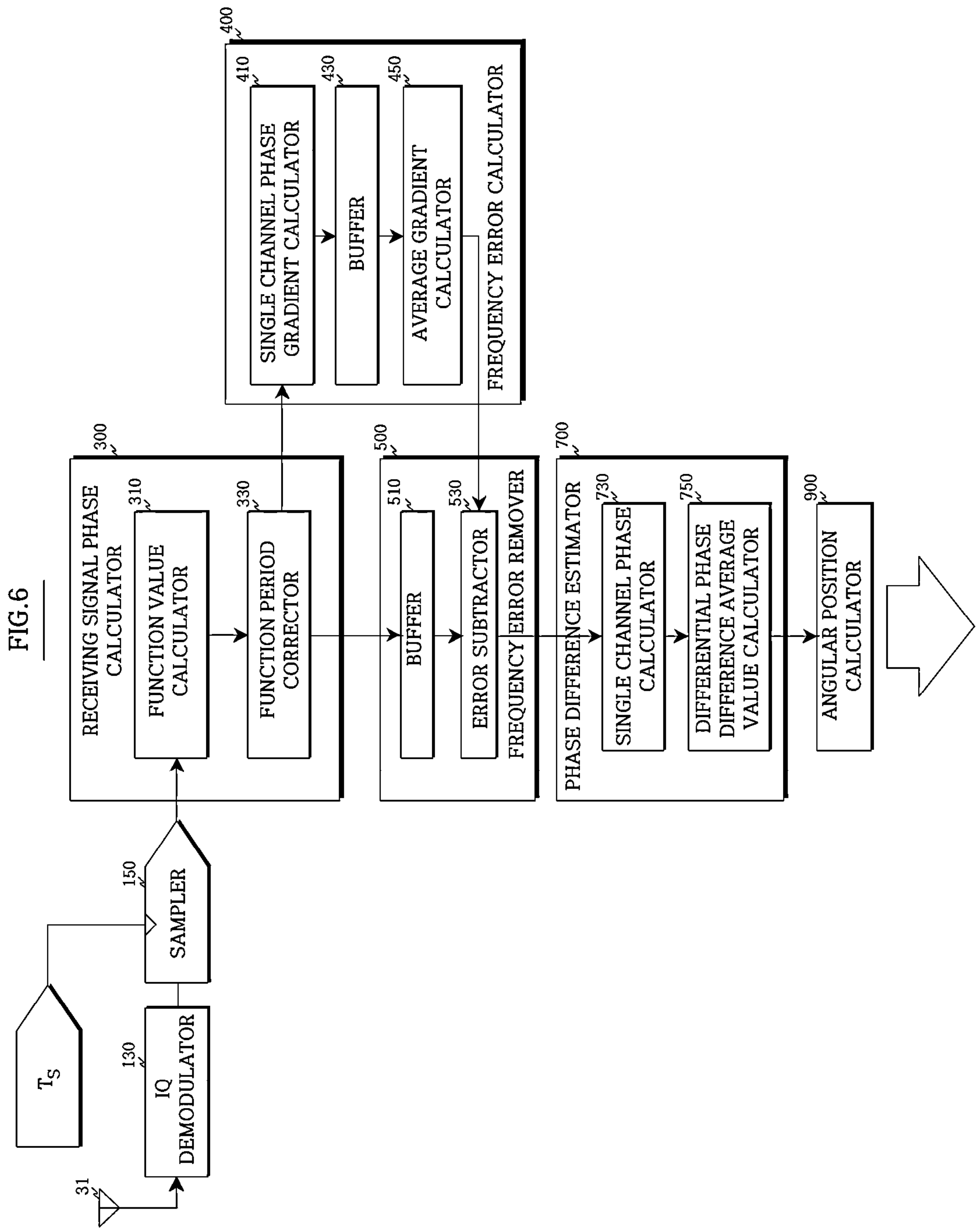
FIG.6
31
130
IQ DEMODULATOR
$T_S$
150
SAMPLER
300
RECEIVING SIGNAL PHASE CALCULATOR
310
FUNCTION VALUE CALCULATOR
330
FUNCTION PERIOD CORRECTOR
400
410
SINGLE CHANNEL PHASE GRADIENT CALCULATOR
430
BUFFER
450
AVERAGE GRADIENT CALCULATOR
FREQUENCY ERROR CALCULATOR
500
510
BUFFER
530
ERROR SUBTRACTOR
FREQUENCY ERROR REMOVER
700
PHASE DIFFERENCE ESTIMATOR
730
SINGLE CHANNEL PHASE CALCULATOR
750
DIFFERENTIAL PHASE DIFFERENCE AVERAGE VALUE CALCULATOR
900
ANGULAR POSITION CALCULATOR

ANGULAR POSITION MEASUREMENT SYSTEM UTILIZING RADIO FREQUENCY SIGNAL

CROSS-REFERENCE TO RELATED APPLICATION

This application claims priority to and the benefit of Korean Patent Application No. 10-2023-0104593, filed on Aug. 10, 2023, the disclosure of which is incorporated herein by reference in its entirety.

BACKGROUND

1. Field of the Invention

The present invention relates to a position measurement technology, and particularly, to an angle-of-departure measurement technology that receives radio frequency signals transmitted from transmitting antennas through a receiving antenna and measures angular positions from the transmitting antennas with respect to the receiving antenna.

2. Discussion of Related Art

According to an angle-of-departure measurement technology, radio frequency signals with the same frequency are transmitted from a plurality of transmitting antennas disposed at regular intervals, the radio frequency signals are received through a single receiving antenna, and the received plurality of radio frequency signals are processed to measure angular positions. In this case, the received radio frequency signals are affected by signal gains or attenuation between transmitting terminals and a receiving terminal and a fluctuation of the signal gains or attenuation, which causes an error in a measured value. In addition, the measured value has an error caused by a frequency or phase mismatching between a local oscillator of the transmitting terminal, which serves as a reference for generating a radio frequency signal in the transmitting terminal, and a local oscillator of the receiving terminal, which serves as a reference for generating a radio frequency signal in the receiving terminal. Accordingly, positioning accuracy of the current angle-of-departure measurement technology has limitations.

SUMMARY OF THE INVENTION

An objective of the present invention is directed to improving positioning accuracy of an angle-of-departure measurement technology.

Another objective of the present invention is directed to providing an angle-of-departure measurement technology with no influence due to a signal gain or attenuation or a fluctuation of the signal gain or attenuation between a transmitting terminal and a receiving terminal.

Still another objective of the present invention is directed to reducing an effect of an error due to a frequency difference or a phase difference between a frequency of a local oscillator of a transmitter and a frequency of a local oscillator of a receiver in an angle-of-departure measurement technology.

According to an aspect of the present invention, an angular position from a wireless transmitter is calculated from a phase value of a ratio of I and Q signals demodulated in an IQ demodulator. In the present specification, a ratio of I and Q signals refers to a ratio of an X-coordinate value to a Y-coordinate value of an (I, Q) complex vector on an I-Q plot, and a phase value of the ratio of the I and Q signals refers to a phase value of a vector converted when an (I, Q) is converted into polar coordinates.

According to an additional aspect, a phase sample value may be calculated from the phase value of the ratio of the I and Q signals, and a phase value of signals received by a receiving antenna from a plurality of transmitting antennas may be estimated. An angular position of the wireless receiver may be calculated from the estimated phase value.

According to an additional aspect, the phase value for each transmitting antenna may be calculated for a period not including a time determined by a switching stabilization time before and after a switching period of the transmitting antenna.

According to an additional aspect, the phase value for each transmitting antenna may calculated from the phase sample values, and a phase value between the plurality of transmitting antennas and the receiving antenna may be estimated from an average value of difference values of phase values between adjacent transmitting antennas.

According to an additional aspect, an error component between the frequencies of the local oscillator of the transmitter and the local oscillator of the receiver may be removed from the received phase value of each transmitting antenna.

According to another aspect, the error component between the frequencies of the local oscillator of the transmitter and the local oscillator of the receiver may be estimated from an average gradient value of the phase values received from the plurality of transmitting antennas.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a block diagram illustrating a configuration of a wireless receiver according to yet another embodiment.

DETAILED DESCRIPTION OF EXEMPLARY EMBODIMENTS

The foregoing and additional aspects are embodied through exemplary embodiments described with reference to the accompanying drawings. It will be understood that components of each embodiment are capable of being variously combined within an embodiment or other embodiments as long as no other mention or mutual contradiction exists. Based on the principle that an inventor may appropriately define the concept of a term to best describe his or her invention, the terms used in the present specification and the appended claims should be construed to have meanings and concepts consistent with the described contents or the proposed technical ideas. Hereinafter exemplary embodiments of the present invention will be described in detail with reference to the accompanying drawings.

Figure 1:
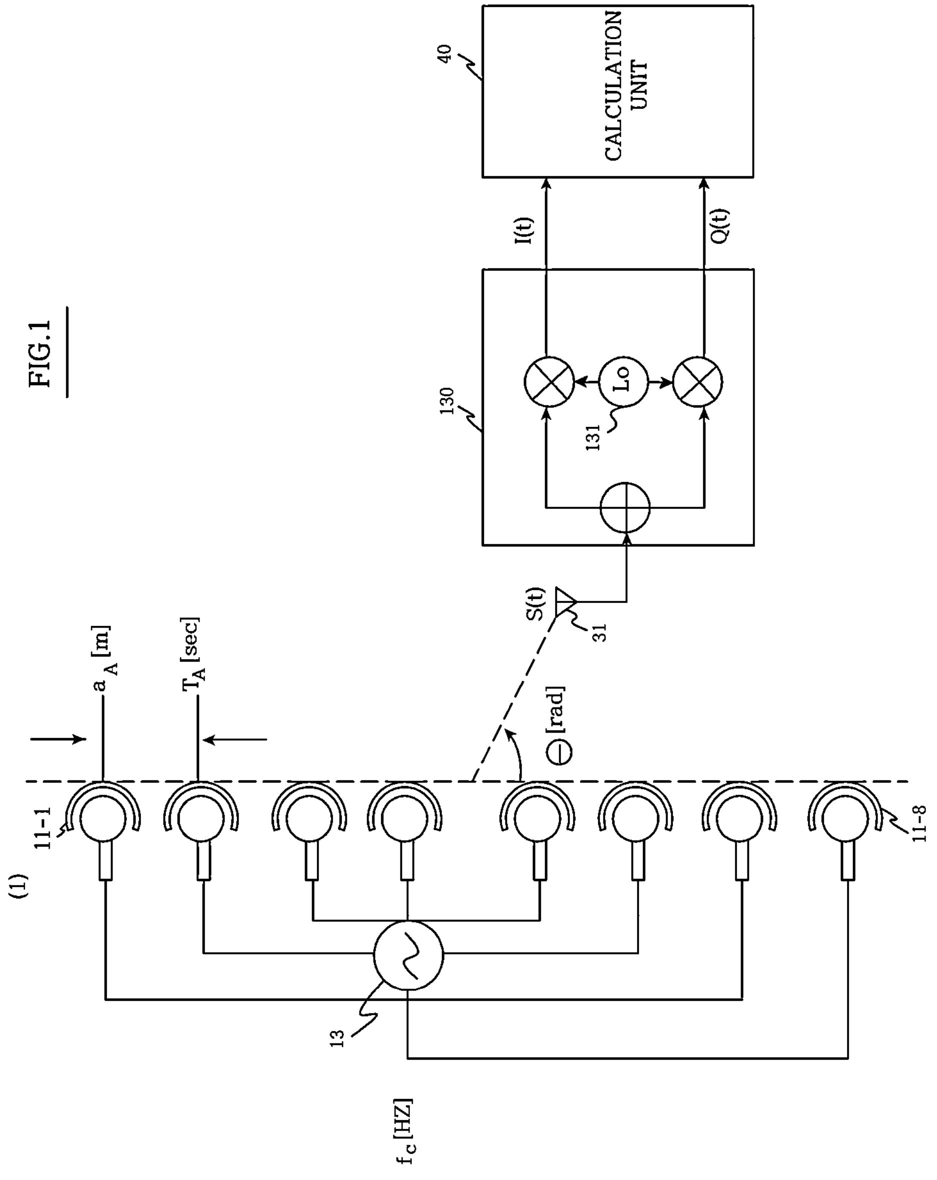
FIG. 1 is a diagram illustrating a configuration of an angular position measurement system according to one embodiment.

FIG. 1 shows a configuration of an angular position measurement system according to one embodiment. As shown in the drawing, the angular position measurement system according to one embodiment includes a wireless transmitter 1 and a wireless receiver 2. A wireless transmitter 1 includes a plurality of transmitting antennas 11-1, . . . , and 11-8 disposed at regular intervals, and a wireless transmitting circuit 13 configured to sequentially drive the plurality of transmitting antennas 11-1, . . . , and 11-8 according to the arrangement order to transmit sinusoidal waves with the same carrier frequency. In the embodiment shown in the drawing, although the number of transmitting antennas is exemplified as eight, but the number may be a smaller number, for example, three, or a larger number.

In one embodiment, the wireless receiver 2 includes a receiving antenna 31, an IQ demodulator 130 configured to perform IQ demodulation on a signal received from the receiving antenna 31, and a calculation unit 40 configured to calculate an angular position from the wireless transmitter 1 based on a phase value of a ratio of I and Q signals demodulated in the IQ demodulator 130.

According to an aspect, the calculation unit 40 calculates the angular position from the wireless transmitter based on the phase values of the I, Q signals demodulated in the IQ demodulator. As an example, the calculation unit 40 may be implemented as software in a digital signal processor. As another example, the calculation unit 40 may be implemented using dedicated hardware including, for example, a field programmable gate array (FPGA) and a microprocessor.

In FIG. 1, a transmitting wave frequency of the wireless transmitter 1 is $f_c$ Hz, a transmitting wave wavelength is $\lambda_c$ m, an interval between the transmitting antennas, i.e., a channel interval between transmitting antenna switching modules is $m\varphi_A$ m, and a channel time of the transmitting antenna switching module is $T_A$ sec. When an angular position between the transmitting antenna and the receiving antenna is θ rad, a signal (t) received from the receiving antenna of the wireless receiver 2 may be expressed as follows.

$$(t) = G(t)\cos\{2\pi(f_c - f_e)t - \varphi_e - m\varphi_A\}$$

Here:

Gain of transmission and reception period: G(t)

Local oscillation frequency error of transmission and reception period: $f_e$ Hz Local oscillation phase difference of transmission and reception period: $\varphi_e$ rad Current waveform of local oscillator of receiver:

$$\begin{cases} i_{LO}(t) = \cos 2\pi f_c t \\ q_{LO}(t) = \sin 2\pi f_c t \end{cases}$$

Channel number of antenna switching module: $m \in [0, M-1]$, and

Transmitting wave phase difference between antenna switching module channels at receiver position $\varphi_A$ rad: $\varphi_A = 2\pi a_A \text{ COS } \theta/\lambda_c$.

In this case, an output of IQ demodulator 130 may be expressed as follows. In one example, LPF[ ] is a low-frequency bandpass filter with a pass band width of $[0, f_c/2]$.

$$\begin{cases} I(t) \\ Q(t) \end{cases} = \begin{cases} LPF[S(t)i_{LO}(t)] \\ LPF[S(t)q_{LO}(t)] \end{cases} = \begin{cases} LPF[G(t)\cos 2\pi f_c t \ \cos\{2\pi(f_c - f_e)t - \varphi_e - m\varphi_A\}] \\ LPF[G(t)\sin 2\pi f_c t \ \cos\{2\pi(f_c - f_e)t - \varphi_e - m\varphi_A\}] \end{cases}$$

When a trigonometric formula is applied, $$\begin{cases} I(t) \\ Q(t) \end{cases} = \begin{cases} LPF\left[\frac{1}{2}G(t)\{\cos(2\pi(2f_c - f_e)t - \varphi_e - m\varphi_A) + \cos(2\pi f_e t + \varphi_e + m\varphi_A)\}\right] \\ LPF\left[\frac{1}{2}G(t)\{\sin 2\pi(2f_c - f_e)t - \varphi_e - m\varphi_A\right) + \sin(2\pi f_e t + \varphi_e + m\varphi_A)\}] \end{cases}$$

is obtained, and $$\begin{cases} I(t) \\ Q(t) \end{cases} = \begin{cases} \frac{1}{2}G(t)\{\cos(2\pi f_e t + \varphi_e + m\varphi_A)\right] \\ \frac{1}{2}G(t)\{\sin(2\pi f_e t + \varphi_e + m\varphi_A)\right] \end{cases}.$$

The phase information $2nf_e t + \varphi_e + m\varphi_A$ unaffected by the gain G(t) of the transmission and reception period from I(t) and Q(t) may be obtained as follows.

$$(2\pi f_e t + \varphi_e + m\varphi_A) = \tan^{-1}\frac{Q(t)}{I(t)},$$

where, $G(t) \neq 0$

Here, when the local oscillation frequency error $f_e$ and the phase difference $\varphi_e$ of the transmission and reception periods are removed, a phase difference $\varphi_A$ may be obtained by removing the periodicity of a tangent function, which is a periodic function, from an inverse tangent function value of the ratio of the demodulated I and Q signals. The local oscillation frequency error $f_e$ of the transmission and reception periods may be measured using a precision measuring instrument during the manufacturing of the wireless transmitter and the wireless receiver. The phase difference $\varphi_e$ may be measured in the wireless receiver, for example, using a synchronization pulse transmitted from the wireless transmitter. A method of removing the periodicity will be described below. In this way, the phase difference value $m\varphi_A$ may be obtained and an angular position estimation value may be obtained from the phase difference value $m\varphi_A$ using the following equation.

$$\varphi_A = 2\pi a_A \cos\theta / \lambda_c$$

$$\theta = \cos^{-1}\frac{\varphi_A \lambda_c}{2\pi a_A}$$

In another aspect, a phase sample value may be calculated from the phase value of the ratio of the I and Q signals, and a phase difference value between the plurality of transmitting antennas and the receiving antenna may be estimated from the phase sample value. An angular position of the wireless receiver may be calculated from the estimated phase difference value.

Figure 2:
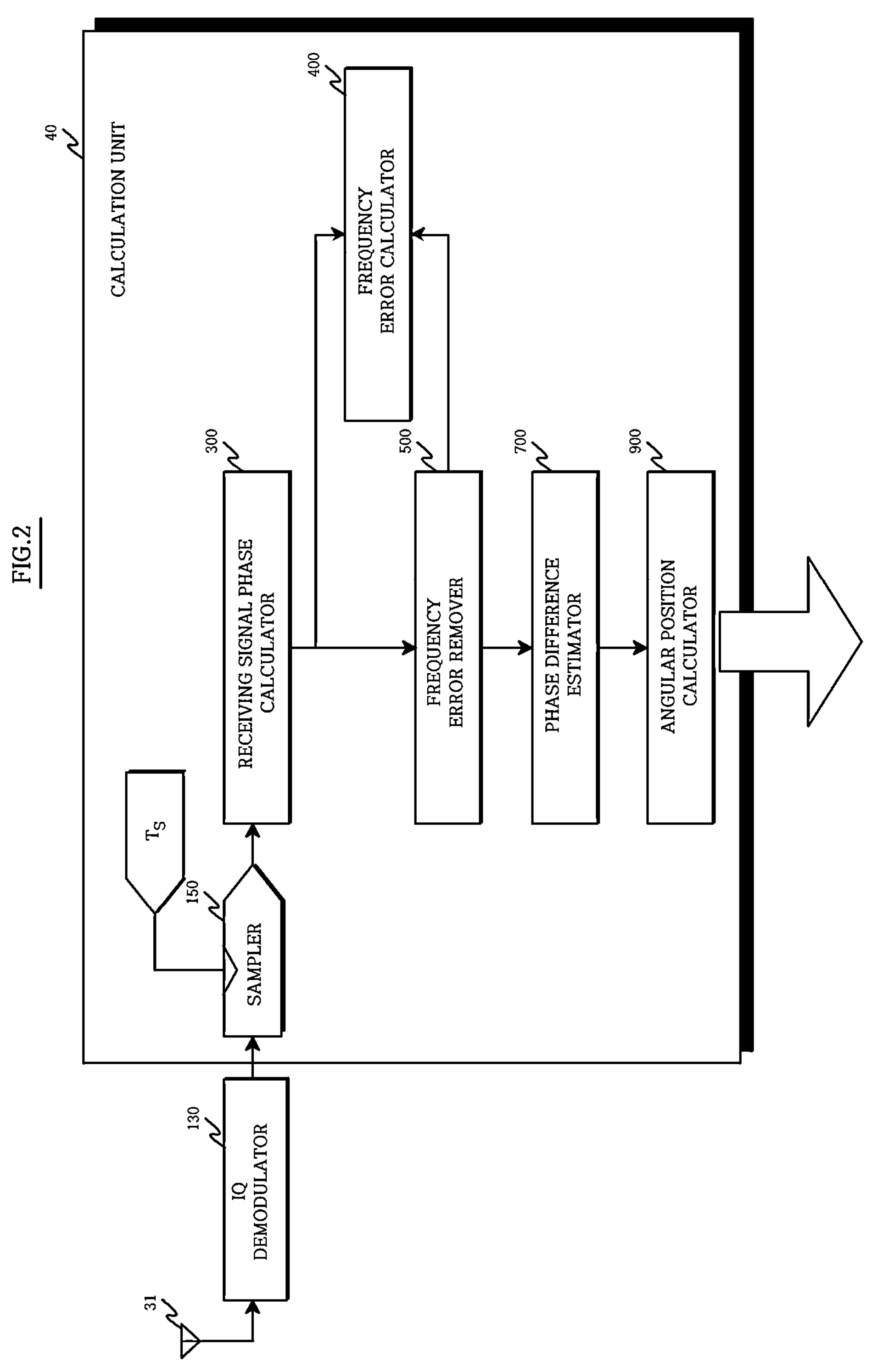
FIG. 2 is a block diagram illustrating a configuration of a wireless receiver according to another embodiment.

FIG. 2 is a block diagram illustrating a configuration of a wireless receiver according to another embodiment. As shown in the drawing, a calculation unit 40 according to another embodiment includes a receiving signal phase calculator 300, a phase difference estimator 700, and an angular position calculator 900. As an example, the calculation unit 40 may be implemented in software in a digital signal processor. As another example, the calculation unit 40 may be implemented using dedicated hardware including, for example, an FPGA and a microprocessor. In the embodiment of FIG. 2, all or some of the blocks may be implemented as program commands executed by a microprocessor or digital signal processor and may be stored in an internal memory in the form of an executable file.

Figure 3:
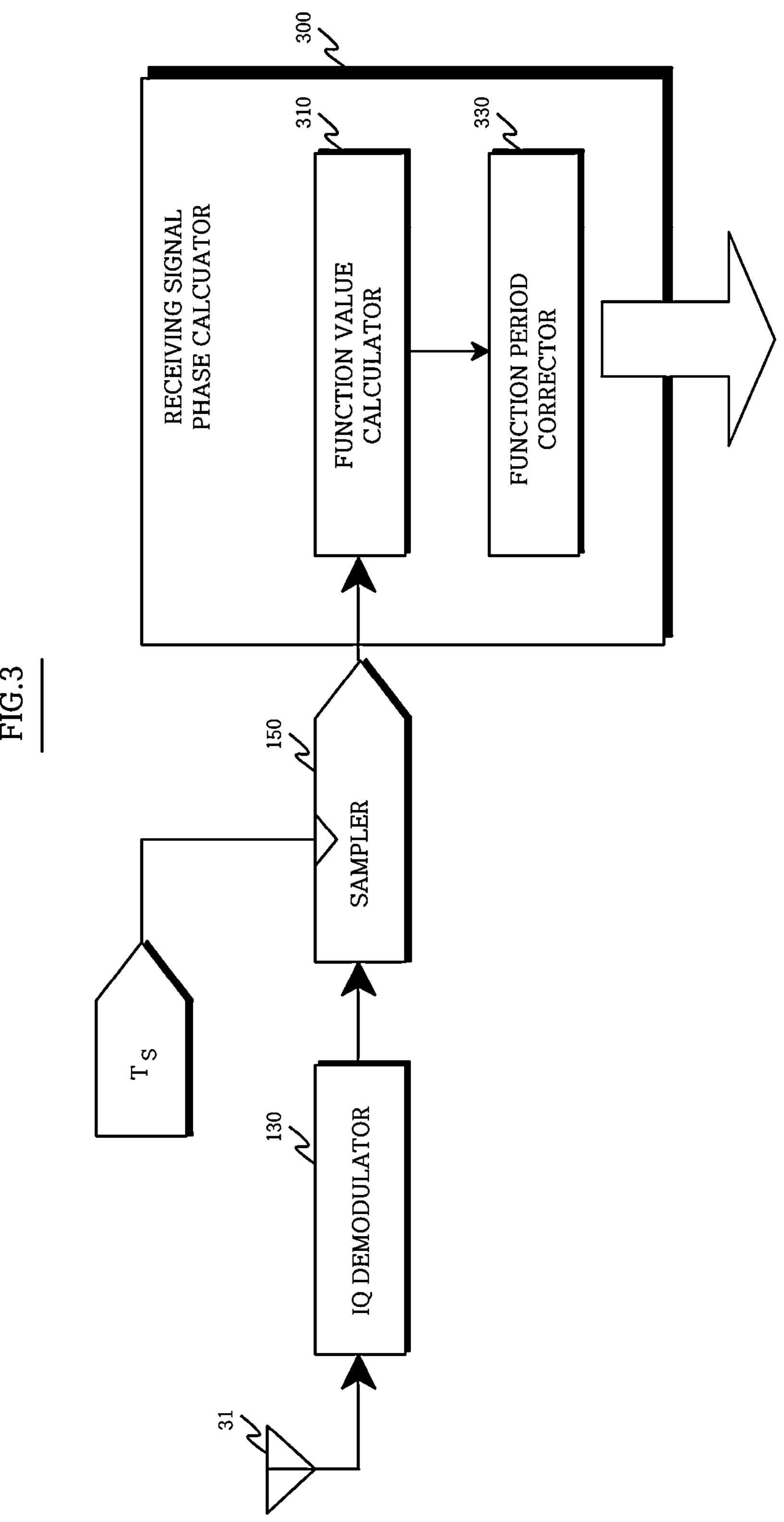
FIG. 3 is a block diagram illustrating a portion of a circuit of a wireless receiver including a receiving signal phase calculator according to one embodiment.

The receiving signal phase calculator 300 calculates the phase sample value from the phase value of the ratio of the I and Q signals. FIG. 3 is a block diagram illustrating a portion of a circuit of the wireless receiver including the receiving signal phase calculator according to one embodiment. Similar components corresponding to FIGS. 1 and 2 are given with the same reference numerals. As shown in the drawing, the I(t) and Q(t) signals output from the IQ demodulator 130 are sampled at a sampling period Ts by a sampler 150. Similar to the embodiment of FIG. 1, a function value calculator 310 calculates a phase sample value [n] from the two sampled signals as follows. Here, the phase sample value is an inverse tangent value of the ratio of the I and Q signals.

$$\phi[n] = \tan^{-1}\frac{Q(nT_s)}{I(nT_s)}$$

Where n is a sample index. In actual implementation, an a tan 2( ) function is used to obtain phase values of the I, Q signal vectors in the range of (−π, π]. This function receives the relative coordinates of two points and calculates and outputs phase angles of the vectors in the range of (−π, π].

According to another aspect, periodic phase sample values obtained by the inverse tangent function may be corrected to obtain absolute phase values. In the embodiment shown in the drawing, a function period corrector 330 calculates and outputs a phase sample value that corrects the function period by adding or subtracting 2π to or from the phase sample value obtained by the a tan 2( ) function according to an increase/decrease state. Since the a tan 2( ) function only has a value between (−π, π], the a tan 2( ) function is corrected to obtain the absolute phase value. This correction is performed according to an increase/decrease of two consecutive phase sample values and may be implemented, for example, by the following algorithm.

```
○ Step 1: initialize 2pi_calibration = 0
○ Step 2: n = 0, φ̃[0] = φ[0]
○ Step 3: if φ[n + 1] > φ[n] then
  if {[n + 1] − φ[n]} > {φ[n] − (φ[n + 1] − 2π)} then
    2pi_calibration −= 2π
    endif
  else
    if {[n] − φ[n + 1]} < {(φ[n + 1] + 2π) − φ[n]} then
    2pi_calibration += 2π
  endif
○ Step 4: φ̃[n + 1] = φ[n + 1] + 2pi_calibration
○ Step 5: ++n, return to Step3 and repeat for all n
```

Figure 4:
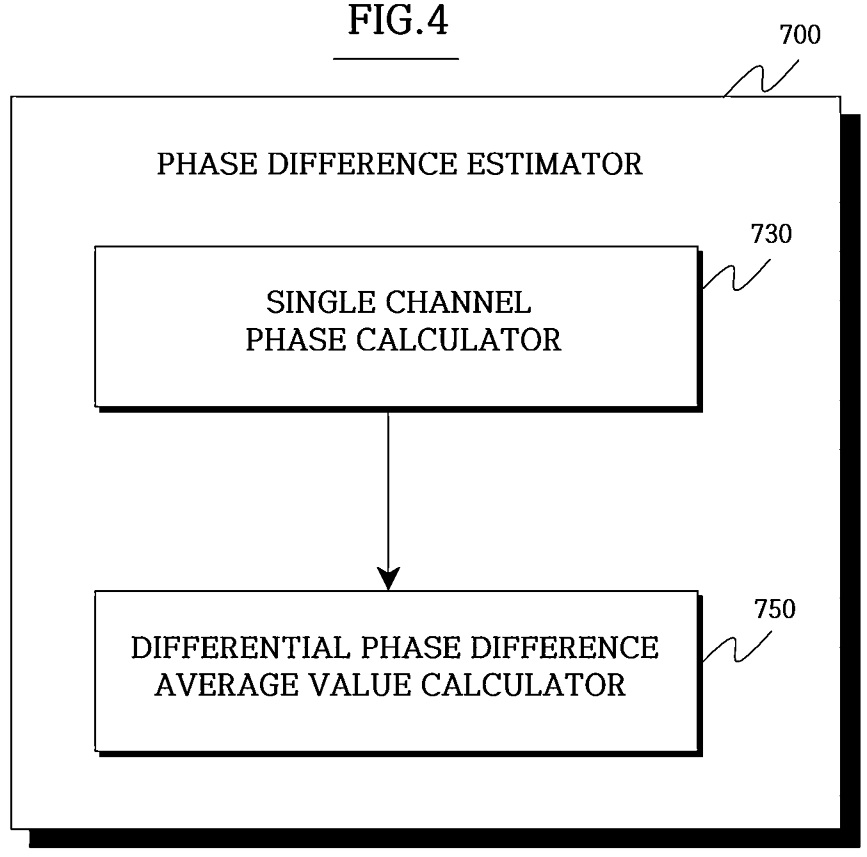
FIG. 4 is a block diagram illustrating a configuration of one embodiment of a phase difference estimator of FIG. 2.

The phase difference estimator 700 estimates a phase value received by the receiving antenna from the plurality of transmitting antennas based on the phase sample values. According to an additional aspect, the phase value for each transmitting antenna is calculated from the phase sample values, and a phase difference value between the plurality of transmitting antennas and the receiving antenna is estimated from an average value of difference values of phase values between adjacent transmitting antennas. FIG. 4 is a block diagram illustrating a configuration of one embodiment of a phase difference estimator of FIG. 2 to which the additional aspect is applied. As shown in the drawing, the phase difference estimator 700 may include a single channel phase calculator 730 and a differential phase difference average value calculator 750.

The single channel phase calculator 730 calculates a phase difference value for each transmitting antenna by averaging the phase sample values for at least a portion of transmitting antenna switching periods for the transmitting antennas. As shown in FIG. 1, when the transmitting antenna switching period is $T_A$, N ($N=T_A/T_S$) phase sample values are obtained from a receiving wave signal obtained by receiving a transmitting wave transmitted from one transmitting antenna during a $T_A$ period according to a sampling frequency. M phase difference values for each transmitting antenna may be obtained by averaging the N phase difference values.

According to an additional aspect, the phase difference value for each transmitting antenna in the single channel phase calculator 730 may be calculated for a period not including a time determined by a switching stabilization time before and after a switching period of the transmitting antenna. Since radio frequency (RF) signals are switched and output from the plurality of transmitting antennas, a signal may be unstable for a certain period of time before and after the switching. When a transmitting antenna index is m by reflecting the above description, an average period time $\{\varphi_m\}$ may be obtained for each m after excluding a predetermined time $T_\delta$ before and after $T_A$ for each $T_A$ period. Accordingly, the number of phase sample values for calculating the average value may be less than N.

The differential phase difference average value calculator 750 calculates an average value of difference values of the phase differences between adjacent transmitting antennas from the phase difference values of each transmitting antenna. The differential phase difference average value calculator 750 buffers the phase difference values for each transmitting antenna output from the single channel phase calculator 730 for one positioning period and calculates the differential values of the phase differences between adjacent transmitting antennas. That is, when the number of antenna indexes is m, $\Delta m=\varphi_m-\varphi_{m-1}$ is obtained for all m, Then, an average of the difference values is calculated as follows.

$$\overline{\Delta}_m = \frac{\sum_{m=1}^{M-1}\Delta_m}{M-1}$$

$\overline{\Delta}_m$ may be regarded as an estimated value of φA.

Referring to FIG. 2 again, the angular position calculator 900 calculates an angular position of the wireless receiver from the wireless transmitter based on the estimated phase difference value. As described above, the estimated position value $\tilde{\theta}$ may be obtained as $$\tilde{\theta} = \cos^{-1}\frac{\lambda_c\overline{\Delta}_m}{2\pi a_A}$$

based on $$\varphi_A = 2\pi \frac{a_A \cos\theta}{\lambda_c}.$$

According to an additional aspect, an error component between the frequencies of the local oscillator of the transmitter and the local oscillator of the receiver may be removed from the phase difference value of each transmitting antenna. Referring to FIG. 2 again, the calculation unit 40 according to one embodiment may further include a frequency error remover 500. The frequency error remover 500 removes the error component between the frequencies of the local oscillator of the transmitter and the local oscillator of the receiver from the phase value of each transmitting antenna.

As described above, the inverse tangent values of the I and Q signals includes a term $2\pi f_e t$ that is a frequency error component.

$$(2\pi f_e t + \varphi_e + m\varphi_A) = \tan^{-1}\frac{Q(t)}{I(t)},$$

here, G(t)≠0

This term is a first-order function component that increases over time in the inverse tangent values of I and Q signals. For example, the frequency error component between these local oscillators may be precisely measured and reflected during the manufacture of the transmitter and the receiver. As another example, a temperature-dependent model may be implemented based on values measured at several temperatures. In this case, the frequency error remover 500 calculates a local oscillation frequency from an ambient temperature value of the local oscillator of the receiver measured by the sensor and calculates the frequency error from a difference with a local oscillation frequency of the transmitter received from the transmitter. Then, a frequency error component may be calculated by multiplying a gradient slope value, which is obtained by multiplying the difference value by 2π, by the sampling index and the sampling period $T_S$. The frequency error component may be removed by subtracting the frequency error component from the phase sample value calculated by the receiving signal phase calculator 300.

Figure 5:
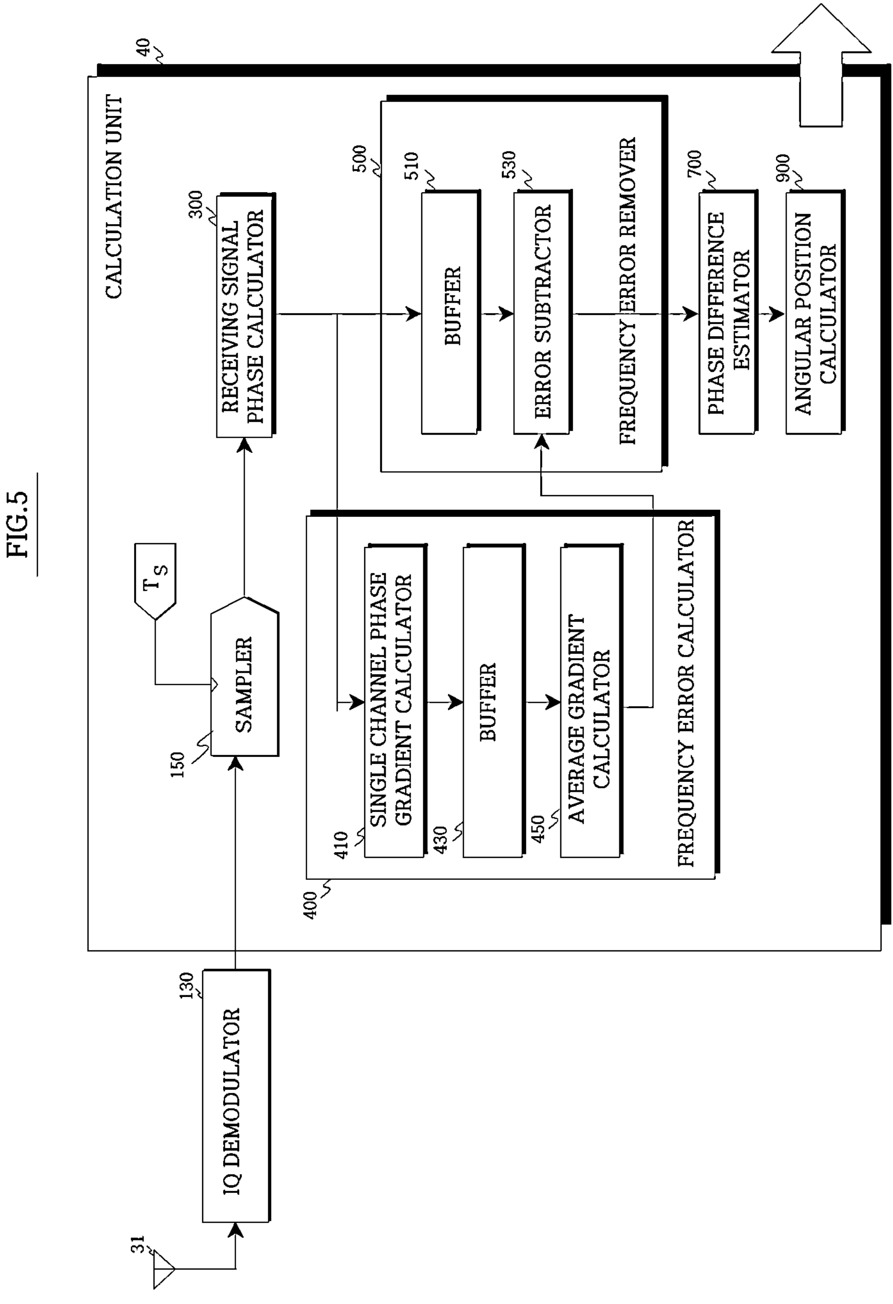
FIG. 5 is a block diagram illustrating a configuration of a wireless receiver according to still another embodiment.

According to another aspect, the error component between the frequencies of the local oscillator of the transmitter and the local oscillator of the receiver may be estimated from an average gradient value of the phase values of samples received from the plurality of transmitting antennas. FIG. 5 is a block diagram illustrating a configuration of a wireless receiver according to another embodiment to which another aspect is applied. As shown in the drawing, a calculation unit 40 of a wireless receiver according to another embodiment includes a frequency error calculator 400.

The frequency error calculator 400 calculates a gradient value of a phase value received through a receiving antenna from a plurality of transmitting antennas based on the phase sample values and multiplies the gradient value by a sampling index to calculate a frequency error component. As shown in the drawing, in one example, the frequency error calculator 400 may include a single channel phase gradient calculator 410 and an average gradient calculator 450.

The single channel phase gradient calculator 410 calculates a gradient value for each transmitting antenna by performing one-dimensional linear approximation on the phase sample values of each transmitting antenna during at least a portion of a switching period of the transmitting antenna. Each of the phase samples $\{\tilde{\phi}[n]\}_m$ received from the m transmitting antennas is processed, and one-dimensional linear approximation is performed on all m∈[0, M−1], i.e., for all transmitting antennas. The one-dimensional linear approximation on N phase sample values for each transmitting antenna is a common technique, and thus a detailed description thereof will be omitted.

According to an additional aspect, the gradient value of the phase for each transmitting antenna in the single channel phase gradient calculator 410 may be calculated for a period not including a time determined by a switching stabilization time before and after a switching period of the transmitting antenna. Since RF signals are switched and output from the plurality of transmitting antennas, a signal may be unstable for a certain period of time before and after the switching. When a transmitting antenna index is m by reflecting the above description, a gradient value $\tilde{S}_m$ may be calculated through one-dimensional linear approximation for each m after excluding a predetermined time $T_\delta$ before and after $T_A$ for each $T_A$ period. Accordingly, the number of phase sample values for one-dimensional linear approximation may be less than N.

Then, the average gradient calculator 450 calculates a gradient of the phase value by averaging the gradient values for each transmitting antenna for all the plurality of transmitting antennas. Since the average gradient calculator 450 should average the gradient values of the phase values for all the transmitting antennas, the frequency error calculator 400 may include a buffer 430 for storing the gradient values of the phase for each of the M transmitting antennas for one positioning period.

In one example, the phase gradient value, which is the average of the gradient values $\tilde{S}_m$ in the signal received from one transmitting antenna and calculated by the single channel phase gradient calculator 410, may be obtained by the following equation.

$$\tilde{S} = \frac{\sum_{m=0}^{M-1} \tilde{S}_m}{M}$$

The phase gradient value is proportional to the frequency error. Thereafter, the frequency error component $2\pi f_e t$ may be calculated from the phase difference by multiplying the phase gradient value by the sampling index n.

In the embodiment shown in the drawing, the frequency error remover 500 includes an error subtractor 530.

The error subtractor 530 may remove a frequency error component by subtracting the frequency error component from the phase sample value as in the following equation.

$$\hat{\phi}[n] = \tilde{\phi}[n] - \tilde{s} \cdot n$$

In this case, the error subtractor 530 should receive radio frequency signals from all the transmitting antennas during one positioning period to calculate the frequency error. Thus, the frequency error remover 500 may include a buffer 510 which stores the phase sample value for one positioning period in order to buffer the phase sample value output from the receiving signal phase calculator 300 while the frequency error calculator 400 calculates the frequency error value for a corresponding positioning period.

FIG. 6 is a block diagram illustrating a configuration of a wireless receiver according to yet another embodiment. In the embodiment shown in the drawing, similar components corresponding to those in the previous drawings are referenced with the same reference numerals. Receiving signal phase calculator A receiving signal phase calculator 300 obtains an inverse tangent value in order to calculate the phase value of the ratio of the I and Q signals and calculates and outputs the phase sample value from the I and Q sample values by correcting a portion that is not reflected because the inverse tangent value is a periodic function. A phase gradient calculator 410 buffers the phase sample value during the measurement period and calculates a local oscillation frequency error component between the wireless transmitter and the wireless receiver from the average phase gradient value of the plurality of transmitting antennas. A frequency error remover 500 removes the frequency error component from each phase sample value and outputs the result. A phase difference estimator 700 calculates and outputs an average phase difference of the signals received from the plurality of transmitting antennas by averaging difference values of phase samples from two adjacent transmitting antennas while buffering the phase sample values from which the frequency error components are removed during the measurement period. An angular position calculator 900 calculates an angular position between the transmitting antenna arrangement and the receiving antenna from the differential phase difference average value.

According to the present invention, demodulated I and Q signals are converted into signals in a polar coordinate format and only phase information is used so that an angular position can be obtained without being affected by a transmission and reception period gain.

In addition, precise frequency measurement of local oscillators of a wireless receiver and a wireless transmitter can become unnecessary by estimating an error component between frequencies of the local oscillators of the transmitter and the receiver from an average gradient value of phase values of signals received from a plurality of transmitting antennas.

As described above, the present invention has been described through embodiments with reference to the accompanying drawings, but the present invention is not limited thereto, and it should be interpreted to cover various modifications that can be obviously derived by those skilled in the art. The appended claims are intended to cover such variations.

What is claimed is:

1. An angular position measurement system comprising:

a wireless transmitter including a plurality of transmitting antennas disposed at regular intervals, and a wireless transmitting circuit configured to sequentially drive the plurality of transmitting antennas according to an arrangement order to transmit sinusoidal waves with the same carrier frequency; and a wireless receiver including a receiving antenna, an IQ demodulator configured to perform IQ demodulation on a signal received from the receiving antenna, and a calculation unit configured to calculate an angular position from the wireless transmitter based on a phase value of a ratio of I and Q signals demodulated by the IQ demodulator.

2. The angular position measurement system of claim 1, wherein the calculation unit includes:

a receiving signal phase calculator configured to calculate phase sample values from the phase value of the ratio of the I and Q signals;

a phase difference estimator configured to estimate a phase difference value between the plurality of transmitting antennas and the receiving antenna from the phase sample values; and an angular position calculator configured to calculate an angular position of the wireless receiver from the wireless transmitter based on the estimated phase difference value.

3. The angular position measurement system of claim 2, wherein the phase difference estimator includes:

a function value calculator configured to calculate the phase sample value from an inverse tangent function value of the ratio of the I and Q signals; and a function period corrector configured to calculate a phase sample value with a corrected function period by adding or subtracting $2\pi$ according to an increase or decrease of the phase sample value.

4. The angular position measurement system of claim 2, wherein the phase difference estimator includes:

a single channel phase calculator configured to calculate a phase difference value for each transmitting antenna by averaging the phase sample values for at least a portion of transmitting antenna switching periods for the transmitting antennas; and a differential phase difference average value calculator configured to calculate an average value of difference values of phase difference values between adjacent transmitting antennas from a phase difference value of each transmitting antenna.

5. The angular position measurement system of claim 4, wherein the phase difference value for each transmitting antenna in the single channel phase calculator is calculated for a period not including a time determined by a switching stabilization time before and after a switching period of the transmitting antenna.

6. The angular position measurement system of claim 2, wherein the calculation unit further includes a frequency error remover configured to remove an error component between frequencies of a local oscillator of the transmitter and a local oscillator of the receiver from the phase sample value.

7. The angular position measurement system of claim 6, wherein the calculation unit further includes a frequency error calculator configured to calculate a gradient value of the phase difference values of the plurality of transmitting antennas from the phase sample values and multiply the gradient value by a sampling index to calculate a frequency error component.

8. The angular position measurement system of claim 7, wherein the frequency error calculator includes:

a single channel phase gradient calculator configured to calculate a gradient value for each transmitting antenna by performing one-dimensional linear approximation on the phase sample value of each transmitting antenna during at least a portion of a switching period of the transmitting antenna; and an average gradient calculator configured to calculate a gradient of the phase difference by averaging a gradient value of each transmitting antenna for all the plurality of transmitting antennas.

9. The angular position measurement system of claim 8, wherein the gradient value for each transmitting antenna in the single channel phase gradient calculator is calculated for a period not including a time determined by a switching stabilization time before and after a switching period of the transmitting antenna.

10. A wireless receiver for angular position measurement, the wireless receiver comprising:

- a receiving antenna configured to receive sinusoidal waves with the same carrier frequency and sequentially transmitted from a plurality of transmitting antennas disposed at regular intervals;
- an IQ demodulator configured to perform IQ demodulation on signals received from the receiving antenna; and
- a calculation unit configured to calculate an angular position from a wireless transmitter based on a phase value of a ratio of I and Q signals demodulated by the IQ demodulator.

11. The wireless receiver of claim 10, wherein the calculation unit includes:

- a receiving signal phase calculator configured to calculate phase sample values from the phase value of the ratio of the I and Q signals;
- a phase difference estimator configured to estimate a phase difference value between the plurality of transmitting antennas and the receiving antenna from the phase sample values; and
- an angular position calculator configured to calculate an angular position of the wireless receiver from the wireless transmitter based on the estimated phase difference value.

12. The wireless receiver of claim 11, wherein the phase difference estimator includes:

- a function value calculator configured to calculate the phase sample value from an inverse tangent function value of the ratio of the I and Q signals; and
- a function period corrector configured to calculate a phase sample value with a corrected function period by adding or subtracting 2π according to an increase or decrease of the phase sample value.

13. The wireless receiver of claim 11, wherein the phase difference estimator includes:

- a single channel phase calculator configured to calculate a phase difference value for each transmitting antenna by averaging the phase sample values for at least a portion of transmitting antenna switching periods for the transmitting antennas; and
- a differential phase difference average value calculator configured to calculate an average value of difference values of phase difference values between adjacent transmitting antennas from a phase difference value of each transmitting antenna.

14. The wireless receiver of claim 13, wherein the phase difference value for each transmitting antenna in the single channel phase calculator is calculated for a period not including a time determined by a switching stabilization time before and after a switching period of the transmitting antenna.

15. The wireless receiver of claim 11, wherein the calculation unit further includes a frequency error remover configured to remove an error component between frequencies of a local oscillator of the transmitter and a local oscillator of the receiver from the phase sample value.

16. The wireless receiver of claim 15, wherein the calculation unit further includes a frequency error calculator configured to calculate a gradient value of the phase difference values of the plurality of transmitting antennas from the phase sample values and multiply the gradient value by a sampling index to calculate a frequency error component.

17. The wireless receiver of claim 16, wherein the frequency error calculator includes:

- a single channel phase gradient calculator configured to calculate a gradient value for each transmitting antenna by performing one-dimensional linear approximation on the phase sample value of each transmitting antenna during at least a portion of a switching period of the transmitting antenna; and
- an average gradient calculator configured to calculate a gradient of the phase difference by averaging a gradient value of each transmitting antenna for all the plurality of transmitting antennas.

18. The wireless receiver of claim 17, wherein the gradient value for each transmitting antenna in the single channel phase gradient calculator is calculated for a period not including a time determined by a switching stabilization time before and after a switching period of the transmitting antenna.

* * * * *